(12) United States Patent
Nakahara et al.

(10) Patent No.: US 6,818,044 B1
(45) Date of Patent: Nov. 16, 2004

(54) PROCESS FOR RECOVERY OF SUBLIMING SUBSTANCE

(75) Inventors: Kenji Nakahara, Himeji (JP); Tsukasa Takahashi, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/621,238

(22) Filed: Jul. 16, 2003

(30) Foreign Application Priority Data

Aug. 2, 2002 (JP) ........................................ 2002-225576

(51) Int. Cl.[7] ................................................ B01D 7/02
(52) U.S. Cl. ........................ 95/290; 55/282.5; 55/428.1
(58) Field of Search ............................ 55/282.4, 282.5, 55/304, 428.1, 466; 117/105, 109, 915; 95/288, 290

(56) References Cited

U.S. PATENT DOCUMENTS

| | | | | |
|---|---|---|---|---|
| 2,692,657 A | * | 10/1954 | Barton | 95/282 |
| 2,762,449 A | * | 9/1956 | Sweeney | 95/229 |
| 3,299,647 A | * | 1/1967 | Roozendaal et al. | 62/637 |
| 4,252,545 A | * | 2/1981 | Haferkorn | 95/271 |
| 4,391,617 A | * | 7/1983 | Way | 95/290 |
| 4,696,683 A | * | 9/1987 | Vitovec et al. | 95/268 |
| 4,725,291 A | * | 2/1988 | Ueoka et al. | 95/290 |
| 6,080,240 A | | 6/2000 | Uchida et al. | 117/105 |
| 6,638,345 B2 | * | 10/2003 | Takahashi et al. | 95/288 |
| 2002/0053288 A1 | * | 5/2002 | Takahashi et al. | 95/288 |

FOREIGN PATENT DOCUMENTS

| | | |
|---|---|---|
| JP | A 10 265474 | 10/1998 |
| JP | 10-279522 | * 10/1998 |

* cited by examiner

Primary Examiner—Richard L. Chiesa
(74) Attorney, Agent, or Firm—Mathews, Collins, Shepard & McKay, PA

(57) ABSTRACT

The present invention relates to a process for recovering subliming substances, which deposit in the form of crystals, from a subliming substance-containing gas by combining a cooling operation for lowering the temperature of collecting tubes for the deposition of crystals below the temperature at which the crystals deposit with a heating operation for heightening the temperature of the collecting tubes above the temperature at which the crystals deposit. A subliming substance is continuously recovered in the form of crystals at a high ratio without suffering the recovered crystals from developing a color.

14 Claims, 1 Drawing Sheet

FIGURE
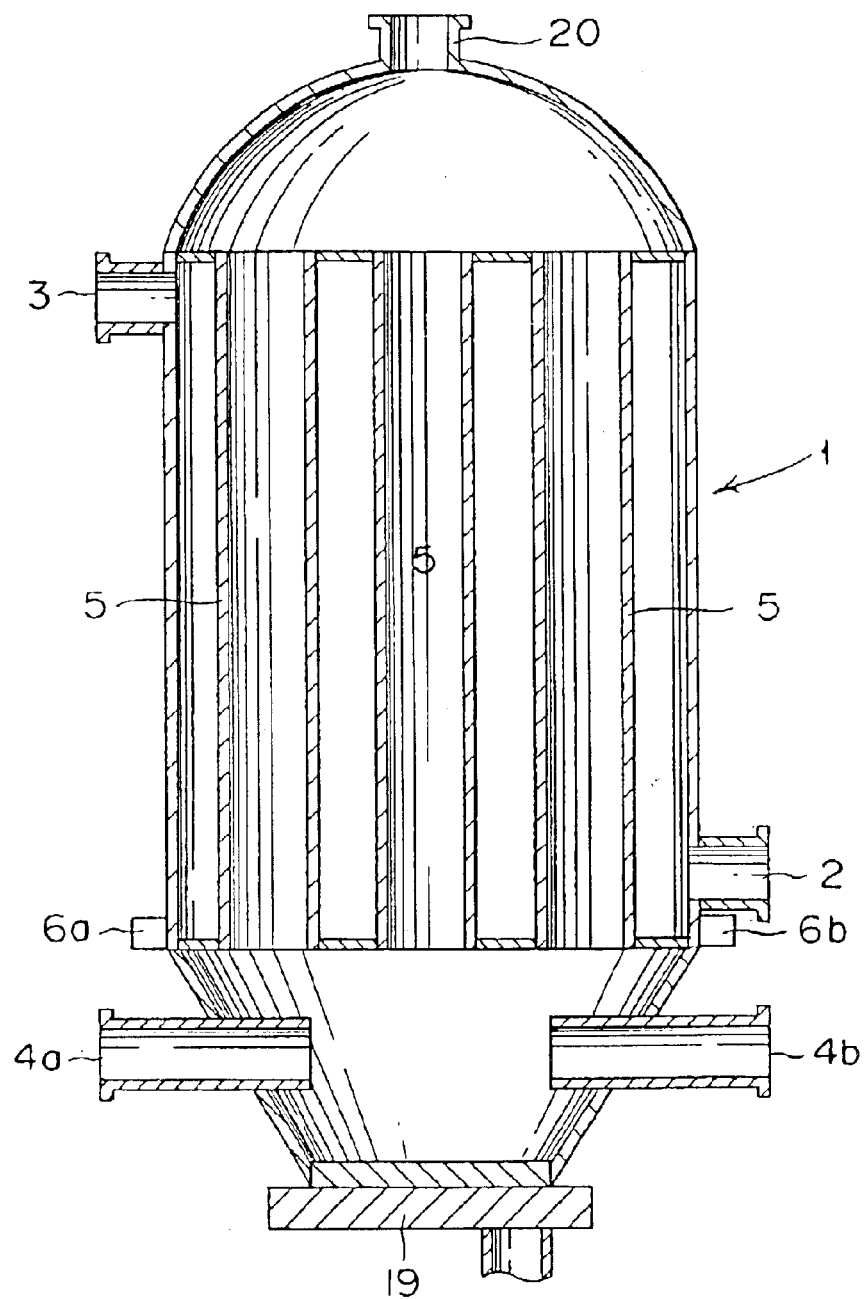

PROCESS FOR RECOVERY OF SUBLIMING SUBSTANCE

BACKGROUND OF THE INVENTION

1. Field of the Invention

This invention relates to a process for recovering a subliming substance and more specifically to a process for recovering a subliming substance produced by a gas phase catalytic oxidation.

2. Description of Related Art

Pyromellitic anhydride is a subliming substance and is useful as the raw material mainly for a heat-resistant macromolecular substance such as polyimide resin or a curing agent for epoxy resins.

A technique for producing pyromellitic anhydride with high purity is disclosed in JP-A-10-265,474, which comprises introducing a pyromellitic anhydride-containing gas into a vertical recovery vessel provided with a surface for the deposition of crystals of pyromellitic anhydride, allowing the pyromellitic anhydride to be deposited in the form of crystals on the surface, and heating the surface to a temperature of 210°–260° C. and thereby causing the crystals to peel from the surface and fall down.

JP-A-10-279,522 also discloses a recovery process which comprises causing pyromellitic anhydride to be deposited in the form of crystals on the surface for crystal deposition and then lowering the temperature of the surface below the temperature during the deposition of crystals thereon thereby causing the deposited crystals to peel off the surface and fall down.

SUMMARY OF THE INVENTION

When a gaseous substance is collected in a solid state, the efficiency of this collection will be enhanced as the temperature at which the collection proceeds is lowered. The lowering of the temperature of this collection, however, has heretofore entailed problems such as causing formed crystals to color and tend easily adhering to the surface used for the collection and, with the decrease in the temperature, suffering the crystals increasingly to gain in density, adherence to the surface, and difficulty of separation from the surface. This collection has been, therefore, performed at such a high temperature as enables the formed product to avoid coloration and allow relatively easy recovery in spite of a low efficiency of collection.

We have made a diligent study of the above problems and have consequently discovered that even crystals collected at a lower temperature than ever can be recovered fully by combining the steps of lowering and heightening the temperature of the surface used for collecting devices. This invention has been achieved as a result.

This invention is accomplished by a process for recovering a subliming substance in the form of crystals from a subliming substance-containing, which process is characterized by combining an operation of cooling the surface of the collecting tubes for deposition of crystals to a temperature lower than the temperature at which the crystals deposit with an operation of heating the surface to a temperature higher than the temperature at which the crystals deposit.

According to the process of this invention, the subliming substance can be recovered continuously with a high efficiency without coloring problem thereof by combining the cooling and heating operations even when a given subliming substance is collected at a lower temperature than ever.

The above and other objects, features and advantages of the present invention will become clear from the following description of the preferred embodiments.

BRIEF DESCRIPTION OF DRAWING

The accompanying drawing incorporated in and forming a part of the specification, illustrates several aspects of the present invention, and together with the description serve to explain the principles of the invention. In the drawing:

FIGURE is a cross section illustrating one example of a shell-and-tube collecting device to be used for this invention.

DETAILED DESCRIPTION OF THE PREFERRED EMBODIMENTS

The term "subliming substance" as used in the specification of this invention means a subliming organic compound, a subliming inorganic compound, and a subliming simple substance that reach a temperature of not lower than 200° C. while they deposit as crystals. Examples of subliming substances may include pyromellitic anhydride, naphthalic anhydride, anthraquinone, terephthalic acid, fumaric acid, nicotinic acid, melamine, alanine, phiroglucinol, chloranil, chloranilic acid, vanillic acid, and hexamethylene tetramine. These compounds can be produced by a gas phase catalytic oxidation reaction. The following description will adopt pyromellitic anhydride as a representative of such subliming substances.

The gas containing pyromellitic anhydride to be used in the present invention is not particularly restricted but only required to contain pyromellitic anhydride. Generally, a gas containing pyromellitic anhydride (which may be referred to as "PMDA" herein below) that is obtained by the catalytic gas phase oxidation of Durene is preferably used. The catalyst for this reaction may be any of the known catalysts. A catalyst which contains vanadium and silver as essential components and has an atomic ratio of silver to vanadium in the range of 0.0001–0.2, for example, may be cited. The concentration of PMDA may be in the range of 10–100 g/N(normal) m$^3$.

FIGURE is a cross-sectional explanatory diagram of the apparatus for the collection of the PMDA as contemplated by this invention. The collecting tubes shown in the diagram are exaggerated for the purpose of clarifying the description.

With reference to FIGURE, a shell-and-tube collecting device 1 formed of a cylindrical vessel is provided in the lower part thereof with a heat transfer medium or refrigerant inlet tube 2 for introducing a heat transfer medium or refrigerant and in the upper part thereof with a heat transfer medium or refrigerant outlet tube 3 for discharging the introduced heat transfer medium or refrigerant. The collecting device 1 is provided therein with dispersed cooling tubes (otherwise called as "collecting tubes") 5 so adapted to allow passage of a heat transfer medium through the gaps between the tubes. Further, the collecting device 1 is provided in the conical part thereof with gas inlet tubes 4a and 4b for introducing a PMDA-containing gas and it is provided in the bottom of the conical part thereof with a crystal discharging device 19 for removing precipitated crystals. The PMDA-containing gas is passed through the interiors of the cooling tubes 5 and, during this passage, is cooled by the heat transfer medium and consequently converted into crystals and deposited on the inner walls of the cooling tubes 5. The collecting device 1 is further provided in the upper part thereof with an emitting part 20 of exhaust gases.

The cooling tubes in the general shell-and-tube heat exchanger have relatively small diameters for the purpose of heightening the heat-exchange capacity of the heat exchanger per unit volume. Those having an approximate diameter of 25.4 mm have been in popular use. It is preferable to use a cooling tube 5 having a larger (inside) diameter. The diameter is generally in the range of 100–500 mm, preferably 150–400 mm, and more preferably 150–300 mm. If the inside diameter falls short of 100 mm, the shortage will be at a disadvantage in rendering separation and recovery of collected crystals difficult. Conversely, if the inside diameter exceeds 500 mm, the excess will be at a disadvantage in degrading the ratio of collection of PMDA because of degrading an inferior cooling efficiency of the central parts of the cooling tubes.

The average speed of the passage of the PMDA-containing gas through the collecting tubes 5 is not particularly restricted but only required to permit necessary collection of the PMDA. It is generally in the range of 0.05–1 m/sec, preferably 0.05–0.5 m/sec. If this average speed falls short of 0.05 m/sec, the shortage will be at a disadvantage in necessitating use of an unduly large facility in spite of a high collecting efficiency and rendering the operation uneconomical. Conversely, if the average speed exceeds 1 m/sec, the excess will be at a disadvantage in degrading the collecting efficiency.

In the vertical shell-and-tube collecting device 1, the direction of passage of the PMDA-containing gas through the cooling tubes 5 may be upward or downward. The up-flow of the gas is preferred over the down-flow thereof for the purpose of facilitating the deposition and growth of crystals.

The heat transfer medium is supplied in a flow for the purpose of cooling the PMDA-containing gas. The medium may be flowed in the same or opposite direction from that of the PMDA-containing gas. The medium is preferably flowed in the same direction from the viewpoint of the thermal efficiency. Optionally, the gaps for passing the heat transfer medium may be divided into two vertical steps, an upper one and a lower one, and two kinds of heat media having different temperatures may be utilized in these two steps to effect cooling. The heat transfer medium is not particularly restricted. Examples of heat transfer mediums may include inorganic salts, oils, and hot water. Specifically, HTS, Dowtherm, and Therm-S are available heat media.

The combination of the cooling operation and the heating operation may be effected in either of the following modes, the cooling operation lowering the temperature of the surfaces for crystal deposition which are the inner walls of the cooling tubes below the temperature of the crystal deposition and the heating operation heightening the temperature of the surfaces above the temperature of the crystal deposition:

(1) Heating the surfaces from the temperature of the crystal deposition and then cooling the surfaces from the heightened temperature, and (2) Cooling the surfaces from the temperature of the crystal deposition and then heating the surfaces from the lowered temperature.

Further, in the process of (1), the surfaces may be further heated to a heightened temperature and, as occasion demands, may be further cooled. By the same token, in the process of (2), the surfaces be further cooled and, as occasion demands, may be further heated to a heightened temperature. By repeating these operations, it is possible to enhance the ratio of recovery.

For a start, the process for performing the heating operation will be described.

Prior to heightening the temperature of the surfaces of the inner walls of the collecting tubes by the use of an apparatus illustrated in FIGURE, the PMDA-containing gas is introduced via the gas inlet tubes 4a and 4b into the shell-and-tube collecting device 1 and the PMDA is deposited in the form of crystals on the inner surfaces (which may be called otherwise as "crystal deposition surfaces") of the cooling tubes 5 which are retained at a prescribed temperature by the heat transfer medium. The introduction of the PMDA into the collecting device is stopped. By switching the heat transfer medium mentioned above to another heat transfer medium retained at a temperature higher than that of the crystal deposition, the temperature of the crystal deposition surfaces is heightened. When the prescribed temperature for crystal deposition is assumed to be 175° C., for example, the heightening of the surface is performed at a temperature not less than 15° C., preferably by 20°–150° C., from 175° C. This reason is that if this increment is not more than 15° C., the shortage will unduly lower the sublimation pressure of crystals and prevent the separation of crystals from being effected fully. This constitution ensures to recover PMDA with high purity by causing the deposited crystals to peel off and fall down. Incidentally, the prescribed temperature of the crystal deposition surfaces is generally in the range of 100°–250° C.

Now, the process for the cooling operation from the temperature of the deposition of crystals will be described.

After PMDA has been deposited in the form of crystals on the crystal deposition surfaces, which are retained at the prescribed temperature by the heat transfer medium, the temperature of the surfaces is lowered below the temperature of the deposition of crystals by switching the cooling medium mentioned above to another cooling medium having a lower temperature than that of the deposition of crystals. When the prescribed temperature is assumed to be 170° C., for example, the cooling of the surfaces is performed at a temperature not less than 15° C., preferably 20°–170° C., lower than 170° C. The cooling medium is one kind of heat transfer medium. This reason is that if the increment falls short of 15° C., the shortage will result in diminishing the difference in expansion and contraction due to the temperatures of the surfaces and the crystals and consequently rendering the separation and fall of the crystals from the surfaces proportionately difficult. To make the purpose of use for cooling clear, the designation of "cooling medium" will be particularly employed here. By employing such a constitution, consequently harnessing the difference in expansion and contraction due to the fall of the temperature of the surfaces from that of the deposited crystal, the deposited crystals are enabled to peel and fall to ensure recovery of PMDA of high purity.

The temperature of the crystal deposition surfaces is preferably controlled to fall at a speed exceeding 15° C./hour and preferably falling in the range of 20°14 170° C./hour for the sake of enabling the deposited crystals to peel and fall easily. This reason is that the difference in thermal conductivity between the deposited crystals and the surfaces consequently causes the difference in temperature between the deposited crystals and the surfaces to exceed 15° C. at a certain point and enables the deposited crystals to assume a state of easily peeling and falling.

Further, it is proper to choose a material for the crystal deposition surfaces that the coefficient of thermal expansion during the fall of the temperature of the surfaces may be not less than $1.0 \times 10^{-5}/°$ C. from the viewpoint of enlarging the difference in expansion and contraction due to the temperatures of the surfaces and the crystals. If the coefficient falls short of $1.0 \times 10^{-5}/°$ C., the shortage will result in diminishing the difference of expansion and contraction between the surfaces and the crystals. Examples of the material, which has a coefficient of thermal expansion of not less than $1.0 \times 10^{-5}/°$ C., may include carbon steel and stainless steel. When stainless steel is used, the coefficient of thermal expansion during the fall of the temperature from 185° C. to 50° C. is about $1.7 \times 10^{-5}/°$ C.

It is effective to grind the crystal deposition surfaces and the conical lateral walls imparted to the lower part of the collecting device for the sake of enabling the deposited crystals to peel and fall easily during both the heating and cooling operations. The grinding treatment performed till the degree of roughness, Ry [JIS (Japanese Industrial Standards) B0691 1994], reaches 9.4 $\mu$m, preferably 5 $\mu$m, and more preferably 1 $\mu$m. The buffing technique and the electrolytic polishing technique may be cited as examples of grinding treatment. The crystal deposition surfaces are preferred to be devoid of any part that is liable to hinder the separation and fall of the crystals. From this point of view, the cooling tubes constituting the crystal deposition surfaces may effectively formed of a seamless tube.

Further, the crystals are effectively recovered by additionally imparting vibration or shock to the crystals to an extent incapable of inducing inconveniences during the separation and fall of the crystals. Examples of the implementation of this measure may include processes which uses a vibrator or a knocker to impart a local vibration or shock, which causes the collecting device to be wholly vibrated, which consists in applying a forced current of high-pressure fluid (liquid or gas) to the crystal deposition surfaces till the crystals are peeled, and which consists in using a soot-blowing technique. The relevant tool may be driven electrically, mechanically, or by means of pressure. The mode of this driving is not particularly restricted. This constitution ensures to heighten further the efficiency of recovery of crystals because the actions of peeling crystals by the combined measures are simultaneously exerted on the crystals. It is effective to use the process of the present invention in combination with a process for imparting a vibration by virtue of acoustic wave to the deposited crystals.

Part of the crystals that have adhered to the cooling tubes spontaneously peel and fall down. For the sake of promoting the separation of the deposited crystals, the collecting device, encircling the cooling tubes, on the periphery thereof should be provided with vibrating or striking mechanisms 6a and 6b. The striking mechanisms may be actuated intermittently or intensively. In consideration of the spontaneous fall of part of the crystals, however, it is advantageous to actuate them intensively after the crystals have been accumulated to a certain extent from the viewpoint of the efficiency of energy. As regards the quantity of striking mechanisms, it is generally proper to provide a plurality of such striking mechanisms, though depending on the size of the striking mechanisms or the efficiency of striking. Though the position for disposing the striking mechanisms is not particularly restricted, at least one such striking mechanism is preferably disposed on a tube sheet with a view to enhancing the effect of peeling. Further, in the case of the heating operation, it is effective to actuate the striking mechanisms after the thermal medium has been heated to a temperature (for example, 250° C.) higher than that of collection or deposition and a sufficient sublimation pressure has been consequently applied to the crystal deposition surfaces for the sake of promoting the separation of deposited crystals.

Further, it is effective to actuate the striking mechanisms after the cooling temperature has been lowered (to 30° C., for example) below the temperature of the collection and a sufficient difference in thermal expansion has been consequently established between the crystals and the crystal deposition surfaces for the sake of promoting more thoroughly the separation of the deposited crystals.

The gas that is discharged from a gas discharging part 20 partly contains the PMDA. The gas is gathered in an empty space 17 formed in the upper part of the collecting device and then treated with an exhaust gas combustion device (not shown) so as to burn flammable substances such as PMDA contained in the exhaust gas. It is permissible to subject the exhaust gas to secondary collection prior to the combustion of the exhaust gas for the sake of collecting the PMDA. The secondary collection may be implemented by using any of collecting mechanisms such as a cyclone, a bag filter, a washing tower, and a wetted-wall column.

The process for recovering the PMDA-containing gas has been described. When a striking or vibrating mechanism such as a knocker is used during the recovery of crystals, which have adhered to the inner walls of the collecting tubes, the operation encounters the possibility of inciting a gas dust explosion, depending on the concentrations of the PMDA gas and dust entering the interior of the collecting device. It is, therefore, necessary to suspend temporarily the feed of the gas to the collecting device during the course of the recovery. It is preferable to use a plurality (two, for example) of shell-and-tube collecting devices and effect continuous collection and recovery of the PMDA by performing the process of recovery with a first shell-and-tube collecting device while continuing the process of collection with a second shell-and-tube collecting device. Specifically, this preferred system can be carried out by providing a valve for dividing the direction of flow of the PMDA-containing gas, connecting the divided flow paths of the gas to not less than two shell-and-tube collecting devices, and performing the process of collection with at least one of the collecting devices while continuing the process of recovery with the other collecting device. This system ensures to recover PMDA of high purity with high efficiency.

EXAMPLES

Now, this invention will be described more specifically below with reference to examples. It should be noted, however, that this invention ought not be interpreted exclusively based on these examples.

Comparative Examples 1–2 and Examples 1–2

In a reaction tube made of stainless steel, measuring 1 inch in inside diameter, and packed with a catalyst having vanadium pentoxide and titanium dioxide as main components and molded in the shape of pellets 5 mm in diameter, Durene of a concentration of 20 g/m$^3$ (Normal)(per 1 m$^3$ of air) was subjected to catalytic gas phase oxidation under the conditions of 5000 Hr$^{-1}$ in space velocity and 385° C. in reaction temperature to form a gas containing PMDA. The degree of conversion of Durene was 99.8 mol % and the selectivity to PMDA was 65.0 mol %.

The PMDA-containing gas thus obtained was cooled tentatively to 235° C. and then introduced into a shell-and-tube collecting device retained in advance at 170° C. by a heat transfer medium.

FIGURE illustrates a longitudinal section of the shell-and-tube collecting device used in this invention. In FIGURE, a reaction product gas containing PMDA was introduced via gas inlet tubes 4a, 4b into the collecting device 1 made of stainless steel (SUS 316) and retained at a prescribed temperature (170° C.) so as to induce deposition of PMDA in the form of crystals on the surfaces of cooling tubes 5.

After the collection was continued for 48 hours, the cooling and heating operation was carried out under the varying temperature conditions shown in Table 1 below. At the same time, the collecting device was struck with striking mechanisms 6a, 6b under the air-knocker striking conditions shown in Table 1 till the deposited crystals on the inner walls of the cooling tubes 5 were peeled and dropped.

The data obtained by the experiment described above, i.e. the radio of recovery of crystals, the purity of PMDA, and the appearance of PMDA, are shown in Table 1 together with the conditions of the operation of varying temperature.

TABLE 1

| Run No. | Comparative Example 1 | Comparative Example 2 | Example 1 | Example 2 |
|---|---|---|---|---|
| Operating condition | Cooling | Heating | Heating→Cooling | Cooling→Heating→Cooling |
| Duration of collection (hrs) | 48 | 48 | 48 | 48 |
| Temperature of collection (° C.) | 170 | 170 | 170 | 170 |
| Rising and falling temperature (° C.) | 170→50 | 170→230 | 170→230→50 | 170→50→230→50 |
| (hrs) | (2 hr) | (1 hr) | (1 hr)(3 hr) | (2 hr)(3 hr)(3 hr) |
| Speed of rising and falling the temperature (° C./hr) | 60 | 60 | 60 | 60 |
| Frequency of striking (number of strikes/hr) | 3 | 6 | 1.5 | 0.75 |
| Total number of strikes imparted | 6 | 6 | 6 | 6 |
| Efficiency of recovery (wt. %) | 63 | 52 | 72 | 96 |
| Purity of recovered PMDA | Not less than 99.8% | Not less than 99.8% | Not less than 99.8% | Not less than 99.8% |
| Appearance of PMDA *1 | White | White | White | White |
| Appearance of PMDA *2 | Pale Yellow | Pale Yellow | White | White |

*1 Appearance of PMDA after one cycle;
*2 Appearance of PMDA after 15 cycles
The term "efficiency of recovery" as used herein refers to the ratio (wt. %) of the recovered crystals to the deposited crystals.

It is clear from Table 1 that the combination of cooling and heating operations enabled even the crystals collected at 170° C. to enjoy a very high efficiency of recovery, whereas the crystals collected at a low temperature as practiced heretofore suffered from a low efficiency of recovery.

As regards the development of color in the product, while the products of the comparative examples were thought to obtain only poor separation of crystals deposited on the crystal deposition surfaces and consequently suffer the crystals developing a color due to the thermal history, the products of the examples showed high ratios of recovery even when the crystals were collected at a low temperature and solved the problem of coloration of the product.

The entire disclosure of Japanese Patent Application No. 2002-225576 filed on Aug. 2, 2002 including specification, claims, drawings, and summary are incorporated herein by reference in its entirety.

What is claimed is:

1. A process for recovering a subliming substance from a subliming substance-containing gas produced by a gas phase catalytic oxidation reaction, which comprises:
    preparing a shell-and-tube collecting device;
    introducing the subliming substance-containing gas into the collecting device to deposit the subliming substance in the form of crystals on inner walls of collecting tubes, which are retained in the collecting device; and
    performing a combination of cooling and heating operation to peel off the deposited subliming substance from the inner wall, the cooling operation lowering the temperature of the collecting tubes for the deposition of crystals below the temperature at which the crystals deposit, and the heating operation heightening the temperature of the collecting tubes above the temperature at which the crystals deposit.

2. A process according to claim 1, wherein an order of the combination of cooling and heating operation is either the cooling and heating operation or the heating and cooling operation.

3. A process according to claim 1, wherein a decrement of the temperature is not less than 15° C.

4. A process according to claim 3, wherein the decrement of the temperature is in the range of 20°–170° C.

5. A process according to claim 1, wherein an increment of the temperature is not less than 15° C.

6. A process according to claim 5, wherein the increment of the temperature is in the range of 20°–150° C.

7. A process according to claim 1, wherein a temperature of the collecting tubes at which the crystals deposit are in the range of 120°–220° C.

8. A process according to claim 1, wherein an inner diameter of the collecting tubes is in the range of 100–500 mm.

9. A process according to claim 1, wherein the subliming substance is at least one selected from the group consisting of pyromellitic anhydride, naphthalic anhydride, anthraquinone, terephthalic acid, fumaric acid, nicotinic acid, melamine, alanine, phiroglucinol, chloranil, chloranilic acid, vanillic acid, and hexamethylene tetramine.

10. A process according to claim 1, wherein the subliming substance is pyromellitic anhydride.

11. A process according to claim 1, wherein the operation of recovery utilizes a plurality of shell-and-tube collecting devices and the subliming substance-containing gas is introduced alternately to the collecting devices.

12. A process according to claim 1 further comprising vibrating or shocking the device after the step of combination of cooling and heating operation to peel off the deposited subliming substance from the inner wall.

13. A process according to claim 1, wherein a surface roughness Ry in the collecting tube is in the range if 1–10 μm.

14. A process according to claim 1, wherein a speed of passage of the subliming substance-containing gas through the collecting tubes is in the range of 0.05–1 m/s.

* * * * *